United States Patent [19]

Sugiyama et al.

[11] 4,413,292

[45] Nov. 1, 1983

[54] ROTARY RECORDING MEDIUM REPRODUCING APPARATUS CAPABLE OF PERFORMING AUTOMATIC SEARCH REPRODUCTION

[75] Inventors: Hiroyuki Sugiyama, Isehara; Masaki Sakurai; Ryuzo Abe, both of Yokohama; Yasuhiro Yusa, Fujisawa; Kenji Yoshihara, Chiba, all of Japan

[73] Assignee: Victor Company of Japan, Ltd., Yokohama, Japan

[21] Appl. No.: 287,823

[22] Filed: Jul. 28, 1981

[30] Foreign Application Priority Data

Jul. 29, 1980 [JP] Japan ............................... 55-103998

[51] Int. Cl.³ ...................... G11B 17/00; G11B 27/28
[52] U.S. Cl. .................................. 360/72.2; 360/77
[58] Field of Search .................... 360/72.2, 72.1, 69, 360/77–78; 369/43–44; 358/310, 347–348

[56] References Cited

U.S. PATENT DOCUMENTS

| 4,199,820 | 4/1980 | Ohtake et al. | 360/78 |
| 4,239,942 | 12/1980 | Van Alem et al. | 360/77 |
| 4,309,721 | 1/1982 | Christopher | 369/59 |
| 4,321,635 | 3/1982 | Tsuyuguchi | 360/72.2 |
| 4,321,700 | 3/1982 | Russell | 369/44 |
| 4,333,117 | 6/1982 | Johnson | 360/78 |

FOREIGN PATENT DOCUMENTS

| 2939912 | 2/1979 | Fed. Rep. of Germany . |
| 3011810 | 3/1980 | Fed. Rep. of Germany . |
| 1281263 | 7/1972 | United Kingdom . |
| 1446255 | 8/1976 | United Kingdom . |

Primary Examiner—Alfred H. Eddleman
Attorney, Agent, or Firm—Louis Bernat

[57] ABSTRACT

A rotary recording medium reproducing apparatus for reproducing a rotary recording medium in which an information signal consisting of a plurality of program contents and an address signal for discriminating a program number of the information signal are recorded, comprises a reproducing device for reproducing the information signal and the address signal from the rotary recording medium, a detection circuit for detecting the address signal from signals reproduced by the reproducing device, a setting circuit for setting a program number of a program which is to be reproduced after performing an automatic searching operation, a transferring device for transferring the reproducing means towards forward and backward directions on the rotary recording medium, and a comparator for comparing the program number set in the setting circuit with a program number of a program of the information signal being reproduced by the reproducing device, and producing and supplying a search signal to the transferring device so that the reproducing device is transferred towards a direction such that the two program numbers coincide. The comparator produces a signal to initiate reproduction of a predetermined mode from the beginning of the program whose program number is set in the setting circuit when the above two program numbers coincide with each other.

5 Claims, 5 Drawing Figures

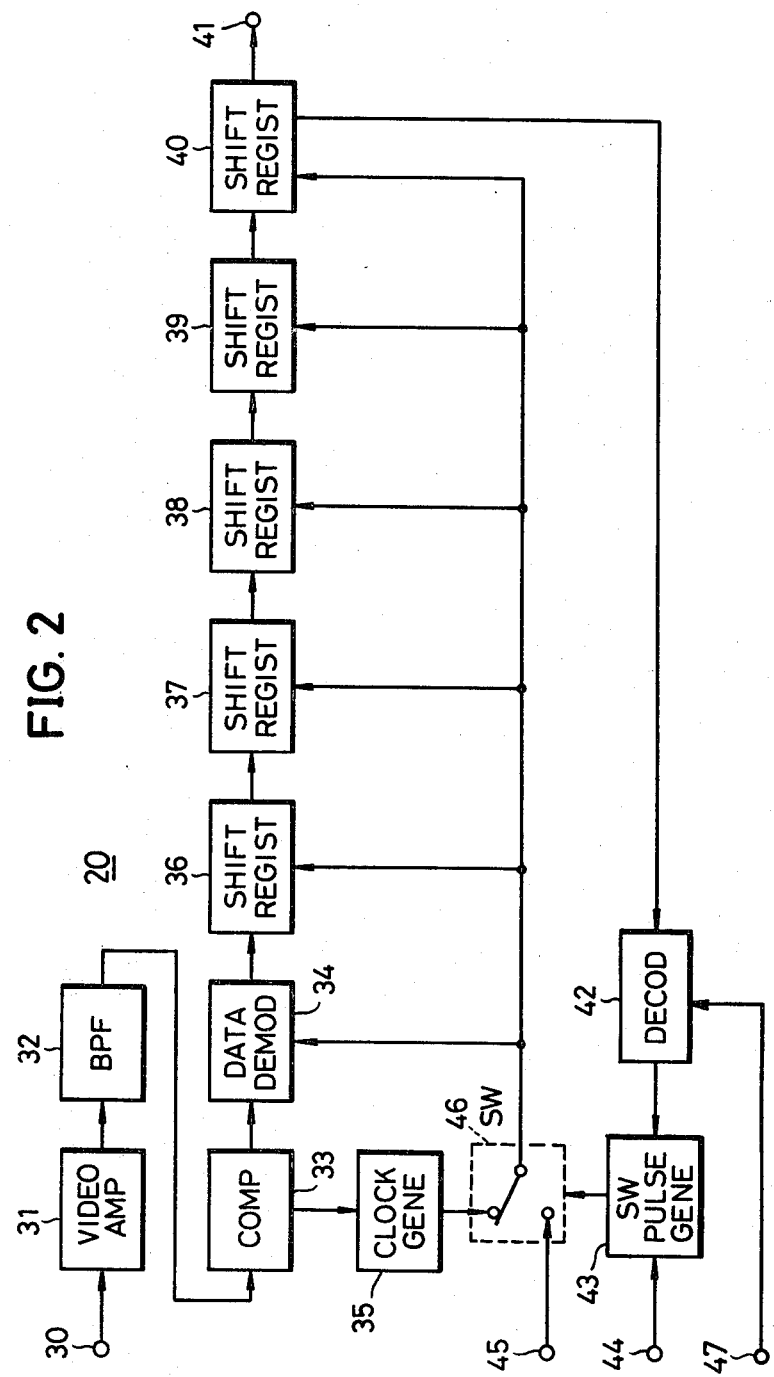

ROTARY RECORDING MEDIUM REPRODUCING APPARATUS CAPABLE OF PERFORMING AUTOMATIC SEARCH REPRODUCTION

BACKGROUND OF THE INVENTION

The present invention generally relates to rotary recording medium reproducing apparatuses capable of performing automatic search reproduction, and more particularly to a rotary recording medium reproducing apparatus which automatically searches the beginning of a predetermined program which is arbitrarily set, in a rotary recording medium recorded with a plurality of respectively numbered programs, to perform reproduction from the beginning of the predetermined program.

There are cases where it is desirable to reproduce an information signal of a predetermined program from the beginning thereof, from a rotary recording medium (hereinafter simply referred to as a disc) recorded with the information signal of a plurality of programs such as a video signal and an audio signal.

In the above case, conventionally, address numbers were established for every field or every track of the video signal in the disc. Hence, by setting an address number corresponding to the beginning of a desired program, the reproducing apparatus performed a search operation until the set address number was obtained. However, in this conventional apparatus, the operation to set the address number corresponding to the beginning of the desired program was troublesome, and there was a disadvantage in that the construction of the apparatus became complex.

SUMMARY OF THE INVENTION

Accordingly, it is a general object of the present invention to provide a novel and useful rotary recording medium reproducing apparatus capable of performing automatic search reproduction, in which the above described disadvantages have been overcome.

Another and more specific object of the present invention is to provide a rotary recording medium reproducing apparatus capable of automatically searching a desired reproduction program which has been set to perform reproduction from the beginning of said desired reproduction program, wherein the desired reproduction program can be set with ease by pushing a desired reproduction program setting button for a number of times required, by establishing program number addresses (hereinafter referred to as chapter addresses) at beginning positions of respective plurality of programs recorded in the rotary recording medium.

Still another object of the present invention is to provide a rotary recording medium reproducing apparatus constructed to automatically search the beginning of a program having a set number and perform reproduction from the beginning of that program, wherein the set number of a desired reproduction program increases by a number respective of the number of times a first button is pushed, and decreases by a number respective of the number of times a second button is pushed.

Other objects and further features of the present invention will be apparent from the following detailed description when read in conjunction with the accompanying drawings.

BRIEF DESCRIPTION OF THE DRAWINGS

FIG. 2 is a systematic block diagram showing an example of an address detection circuit within the block system shown in FIG. 1;

DETAILED DESCRIPTION

Figure 1:
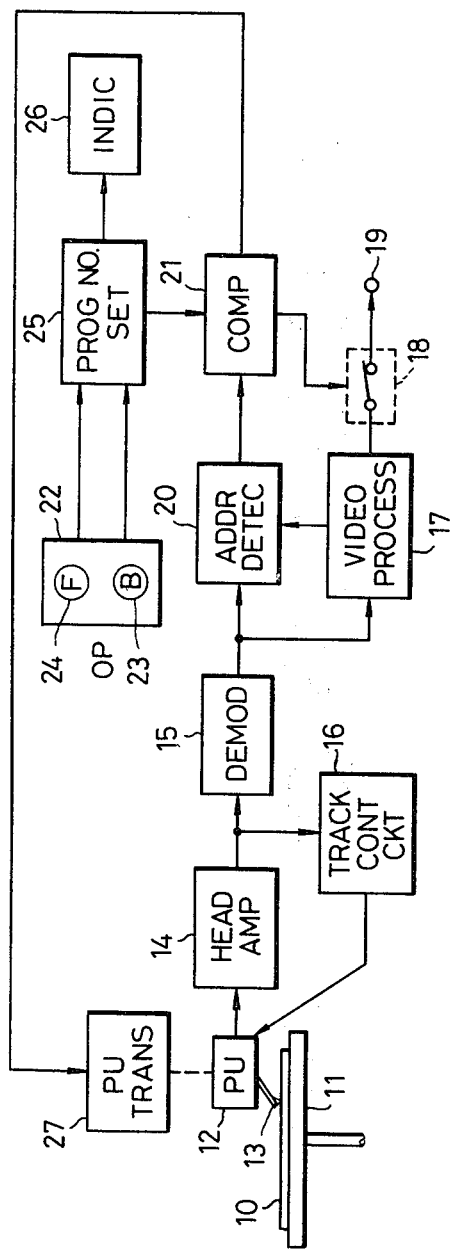
FIG. 1 is a general systematic block diagram showing an embodiment of a rotary recording medium reproducing apparatus according to the present invention.

In FIG. 1, a rotary recording medium (disc) 10 in which a video signal is recorded, is rotated at a predetermined speed by a turntable 11. A reproducing stylus 13 of a signal pickup device 12 makes contact with the recording surface of the disc 10, to pickup and reproduce the recorded signal from the disc 10. In the present embodiment of the invention, the video signal is recorded on the disc 10 as a variation in geometrical configuration, and the recorded video signal is reproduced from the disc 10 due to variation in the electrostatic capacitance between the disc 10 and an electrode of the reproducing stylus 13. Further, reference signals for performing tracking control are recorded on the disc 10 besides the video signal, and these reference signals are reproduced together with the video signal.

The signal picked up and reproduced from the disc 10, is supplied to a demodulator 15 and a tracking control circuit 16 through a head amplifier 14. Reference signals for tracking control are separated at the tracking control circuit 16, and a tracking control signal is formed from these reference signals. The tracking control signal thus formed by the tracking control circuit 16 is supplied to a coil used for tracking within the pickup device 12. Accordingly, tracking control is performed so that the reproducing stylus 13 accurately scans over the video signal tracks on the disc 10.

On the other hand, the picked up video signal is demodulated at the demodulator 15, and then supplied to a video signal processing circuit 17 wherein a predetermined signal processing is performed. Hence, the demodulated video signal thus subjected to the predetermined signal processing, is supplied to an image receiving tube (not shown) of a receiver from a terminal 19, through a muting switch 18 which is closed, and reproduced as a reproduced picture. The signal from the demodulator 15 is also supplied to an address signal detection circuit 20 wherein an address signal within the signal thus supplied is detected. The detected address signal is supplied to a comparator 21.

Four fields of video signals, for example, are recorded in a spiral track of the disc 10, for one rotation of the disc 10. Further, vertical synchronizing signals are recorded at four positions per one track turn of the disc 10. In each of the vertical blanking periods, a coded address signal (chapter address signal) indicating addresses of program numbers established in order for every plurality of programs recorded in the disc from the outermost peripheral side to the innermost peripheral side of the disc 10 and indicating local addresses within the above plurality of programs, is recorded at a position at the seventeenth H (H indicates a horizontal scanning period) from the rising edge of the vertical synchronizing signal. Further, a coded address signal (time address signal) indicating absolute address of the position of the information signal as a time data indicating the time required to perform normal reproduction from an outermost peripheral position of the disc 10 to the position indicated by the absolute address, is recorded at a position at the eighteenth H from the rising edge of the vertical synchronizing signal.

Figure 3:
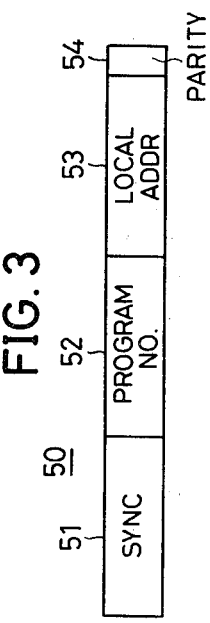
FIG. 3 is a diagram generally showing a chapter address signal.

A chapter address 50 consists of synchronizing bits 51 having six bits, program number bits 52 having eight bits, local address bits 53 having twelve bits, and a parity bit 54 having one bit, that is, the chapter address 50 consists of a total of twenty-nine bits as substantially shown in FIG. 3. Information signals of a plurality of programs are recorded in the disc 10. Numbers such as "1", "2", "3", - - - , are provided in order for every program from the outer periphery to the inner periphery of the disc 10, and the above program number indicates these numbers provided for the programs. The local address bits 53 indicate a local address within one of the above programs, and for example, the content in the local address bits 53 increases by one for every second, that is, for every fifteen tracks upon normal reproduction.

The address signal detection circuit 20 comprises a block system shown in FIG. 2, for example. The reproduced signal supplied from the demodulator 15 through a terminal 30, is amplified to a desired level at a video amplifier 31 consisting of a differential amplifier. The reproduced signal thus amplified at the video amplifier 31 is supplied to a band-pass filter 32 wherein the address signal is obtained. The address signal obtained at the band-pass filter 32 is subjected to waveform-shaping at a comparator 33 wherein the level of the address signal is compared with a reference level. The output of the comparator 33 is supplied to a data demodulator 34 and to a self-reproducing type clock pulse generator 35. The data which is demodulated at the data demodulator 34 is successively shifted at shift registers 36, 37, 38, 39, and 40.

On the other hand, the output of the shift register 40 is also supplied to a decoder 42 wherein synchronizing bits 51 existing at the beginning of the chapter address signal 50 are detected. The detected synchronizing bits are supplied to a switching pulse generating circuit 43 comprising a flip-flop, for example, to set the switching pulse generating circuit 43. The switching pulse generating circuit 43 is reset by a vertical synchronizing signal of the video signal which is supplied from the video signal processing circuit 17 through a terminal 44. Hence, the above switching pulse generating circuit 43 generates a switching pulse in response to the above setting and resetting operations.

A switching circuit 46 is switched over by a switching pulse supplied from the switching pulse generating circuit 43, and passes the clock pulse from the clock pulse generating circuit 35 in order to read in data during a period in which the data of the chapter address signal exists. Further, the switching circuit 46 performs a switching operation to pass the clock pulse supplied from the micro-computer (not shown) which peforms the operations of the address detection circuit 20, the comparator 21, and a program number setting device 25, through a terminal 45, to shift the data through the shift registers 36 through 40 by the clock pulse. The chapter address signal obtained from the output terminal is supplied to the comparator 21. This chapter address thus obtained has a program number address and a local address within that program, as described above.

Although not shown in the figures, when the reproducing apparatus is to use the above time address signal for another mode, a time address instruction signal is supplied to the decoder 42 through a terminal 47. Hence, the decoder 42 is set so as not to detect the sychronizing bits in the chapter address signal, but to detect the synchronizing bits in the time address signal. Accordingly, the address signal detection circuit 20 performs an operation to detect the time address signal.

Figure 4A:
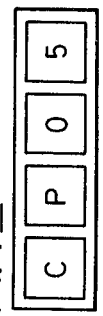
FIGS. 4A and 4B respectively are diagrams for explaining display of an instruction program number.

In a case where it is desirable to reproduce a program which is being reproduced for a second time from the beginning of the program, while observing the reproduced picture in the above image receiving tube, a backward button 23 of a chapter search manipulation part 22 is pushed once. By this operation, a number (37 5", for example) of the program being reproduced and a local address "0" are respectively set in the program number setting device 25 which sets the program number as a search mark. The set program number ("CPO5"), for example, is displayed in an indicator 26, as shown in FIG. 4A. In this case, the program number which is displayed is the same as the program number of the program being reproduced, and thus, the display in the indicator 26 does not change.

A backward search signal is obtained from the comparator 21, and supplied to a device 27 for transferring the pickup device 12. The pickup device 12 is thus transferred towards the outer peripheral direction of the disc 10 along the radial direction of the disc 10 (towards the backward direction) by the transferring device 27.

Signals are reproduced even during the interval in which the pickup device 12 is being transferred. Hence, the chapter address signal is supplied to the comparator 21 from the address signal detection circuit 20. The comparator 21 performs an operation to compare the program number ("5") and the local address ("0") set in the setting device 25 with the program number ("5") and the local address of the chapter address signal obtained from the address signal detection circuit 20. In this example, the program number set in the setting device 25 and the program number of the chapter address obtained from the address signal detection circuit 20 are the same. Accordingly, when the decreasing local address becomes "0" as the pickup device 12 is transferred towards the backward direction, the comparator 21 produces a normal reproduction instruction signal, and supplies this normal reproduction instruction signal to the transferring device 27. Therefore, the automatic searching operation is completed, and the pickup device 12 starts to perform normal reproduction from the beginning of the program having the program number "5".

During the above described automatic searching operation, the muting signal is produced from the comparator 21, to open the muting switch 18. Hence, signals are not supplied to the image receiving tube during the automatic searching operation, and unpleasant pictures are prevented from appearing in the reproduced picture.

Figure 4B:
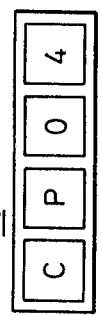

In a case where a previous program which is one program before the program being reproduced is to be reproduced from the begining thereof, the backward button 23 is pushed two times. By this operation, a program number "4" which is one less than the program number "5" being reproduced, and the local address number "0" are set in the setting device 25. Accordingly, as shown in FIG. 4B, the set program number "CPO4" is displayed in the indicator 26.

Accompanied by the above operation, a backward search signal is obtained from the comparator 21. Hence, the signal pickup device 12 is transferred towards the outer peripheral direction (backward direction) along the radial direction of the disc 10, by the transferring device 27. The comparator 21 performs a comparing operation to compare the program number "4" and the local address "0" set in the setting device 25 with the program number and the local address of the chapter address signal obtained from the address signal detection circuit 20.

In this example, since the program number is "5" upon starting of the automatic searching operation, the signal pickup device 12 is continuously transferred towards the backward direction even after the local address in the setting device 25 and the local address from the address detection circuit 20 coincide with "0". Moreover, the comparator 21 produces and supplies a normal reproduction instruction signal to the transferring device 27, when the program number and the local address set in the setting device 25 respectively coincide with the program number and the local address obtained from the address signal detection circuit 20 at "4" and "0". Therefore, the automatic searching operation is thus completed, and the pickup device 12 starts to perform normal reproduction from the beginning of the program having the program number "4".

Similarly, by pushing the backward button 23 N-times (N is an integer), automatic searching operation is performed to perform normal reproduction from the beginning of a program which is (N−1)-programs before the program being reproduced. The backward search signal supplied to the device 27 from the comparator 21 is a signal for transferring the pickup device 12 at a speed which is respective of the difference between the program number set in the setting device 25 and the program number upon starting of the automatic searching operation. In a case where the set program number is the same as or very close to the program number upon starting of the automatic searching operation, the signal pickup device 12 is transferred at a speed which is sixty-four times that upon normal reproduction, for example. When the above program numbers differ by some amount or by a considerable amount, for example, the signal pickup device 12 is transferred at one hundred twenty-five times or one thousand two hundred times the speed upon normal reproduction.

Furthermore, in a case where a program which is ahead of the program being reproduced, that is, where a program having a program number larger than that of the program being reproduced, is to be reproduced from the beginning thereof by performing the automatic searching operation, a forward button 24 is pushed. When a program having a program number "5" is to be reproduced while a program having a program number "4" is being reproduced, for example, the forward button 24 is pushed once. By this operation of the forward button 24, a program number "5" and a local address "0" are respectively set in the setting device 25, and the display in the indicator 26 changes from "CPO4" shown in FIG. 4B to "CPO5" shown in FIG. 4A. Moreover, a forward search signal is supplied to the device 27 from the comparator 21, to transfer the signal pickup device 12 towards the inner peripheral direction (forward direction) along the radial direction of the disc 10.

The comparator 21 performs a comparing operation to compare the program number "5" and the local address "0" set in the setting device 25 with the program number and the local address obtained from the address signal detection circuit 20, and produces a normal reproduction instruction signal. Accordingly, after the above automatic searching operation is completed, the signal pickup device 12 performs normal reproduction from the beginning of the program having the program number "5".

Similarly, by pushing the forward button 24 M-times (M is an integer), automatic searching operation is performed to perform normal reproduction from the beginning of a program which is M-programs ahead of the program being reproduced.

In the above embodiment of the invention, the apparatus is constructed to perform normal reproduction after performing the automatic searching operation. However, the apparatus can be provided with means for setting the reproducing speed after the automatic searching operation, so as to perform slow-motion or quick-motion reproduction after the automatic searching operation, at a reproducing speed set by the above means.

In addition, in the above embodiment of the invention, the so-called electrostatic capacitance reproduction system which performs reproduction according to the variation in the electrostatic capacitance is used as the reproduction system. However, the present invention is not limited to this application, and can be applied to a so-called optical reproduction system which performs reproduction by use of a lazer beam.

Further, this invention is not limited to the above described embodiments, but various variations and modifications may be made without departing from the scope of the present invention.

What is claimed is:

1. An apparatus for reproducing a rotary recording medium in which an information signal comprising a plurality of programs and an address signal for identifying each program by a number are recorded, said reproducing apparatus comprising:

reproducing means for reproducing said information signal and said address signal from said rotary recording medium;

detection means responsive to said reproducing means for detecting said address signal from signals reproduced by said reproducing means;

setting means for setting a program number of a program which is to be reproduced after an automatic searching operation;

transferring means for transferring said reproducing means in forward and backward directions across said rotary recording medium; and comparing means responsive jointly to said reproducing means and said setting means for comparing the program number set in said setting means with an address of a program of the information signal being reproduced by said reproducing means, and for producing and supplying a search signal to said transferring means so that said reproducing means is transferred in a direction which makes the program and address coincide, said comparing means producing a signal to initiate a reproduction of a predetermined mode from the beginning of the program identified by the program number set in said setting means when the program number coincides with the address, said setting means having a first manipulation part for setting a program number of the program being reproduced when operated once and setting a program number of a previous program which is (N-1)-programs before the program being reproduced when operated N-times, where N is an integer which is greater than or equal to two, a second manipulation part for setting a program number of a program which is M-programs after the program being reproduced when operated M-times, where M is an integer, and means for memorizing the program numbers which are set by said first and second manipulation parts.

2. A rotary recording medium reproducing apparatus as claimed in claim 1 in which said address signal has a program number address for indicating the program number of said program and a local address for indicating a position within that one program, and said setting means memorizes the set program number and the local address of the beginning of that program.

3. A rotary recording medium reproducing apparatus as claimed in claim 2 in which said comparing means compares the program number and the local address set by said setting means with a program number and a local address of an address signal reproduced by said reproducing means, to produce a signal to initiate reproduction of a predetermined mode when the above address numbers and the local addresses respectively coincide.

4. A rotary recording medium reproducing apparatus as claimed in claim 1 which further comprises indicating means for displaying the program number set by said setting means.

5. A rotary recording medium reproducing apparatus as claimed in claim 1 which further comprises interrupting means for interrupting supply of a video signal reproduced by said reproducing means to an image receiving device, said comparing means interrupting supply of the reproduced video signal to the image receiving device by said interrupting means during an automatic searching operation.

* * * * *